Dec. 21, 1954 E. L. ARNESON Re. 23,912

ARTICLE CARRIER

Original Filed Nov. 13, 1951 3 Sheets-Sheet 1

INVENTOR.
Edwin L. Arneson,
BY
Cromwell, Greist & Warden
Attys.

Dec. 21, 1954 E. L. ARNESON Re. 23,912

ARTICLE CARRIER

Original Filed Nov. 13, 1951 3 Sheets-Sheet 2

INVENTOR.
Edwin L. Arneson,
BY
Cromwell, Strust + Warden
Attys

Dec. 21, 1954 E. L. ARNESON Re. 23,912

ARTICLE CARRIER

Original Filed Nov. 13, 1951 3 Sheets-Sheet 3

INVENTOR.
Edwin L. Arneson,
BY
Cromwell, Greist & Warden
Attys.

United States Patent Office

Re. 23,912

Reissued Dec. 21, 1954

23,912

ARTICLE CARRIER

Edwin L. Arneson, Morris, Ill., assignor to Morris Paper Mills, Chicago, Ill., a corporation of Illinois Original No. 2,634,043, dated April 7, 1953, Serial No. 256,065, November 13, 1951. Application for reissue June 3, 1953, Serial No. 359,453

6 Claims. (Cl. 220—111)

Matter enclosed in heavy brackets [ ] appears in the original patent but forms no part of this reissue specification; matter printed in italics indicates the additions made by reissue.

This invention relates to improvements in a paperboard carrier for bottles and similar articles of uniform size and shape. A cellular article carrier is afforded thereby which provides full depth side protection for bottles placed in the cells thereof, coupled with a suspending handle of increased strength and rigidity which also has other attractive features.

This application is a continuation-in-part of my copending application Serial No. 235,978, filed July 10, 1951.

It is an object of the invention to provide an improved article carrier fabricated of a paperboard blank of a minimum size to provide a multiple-ply longitudinal partition and handle panel from which certain cross partition panels are cut, one of the longitudinal partition plies having a flap of substantial size hinged to the lower margin thereof and covering certain openings therein which result from the cutting thereof to produce the cross partition elements, and the top of the longitudinal partition and handle panel being strongly reinforced by additional partial depth plies taken from an area of the blank [which would normally represent, in the main, waste material, said carrier having integral side walls and bottom] *which is in part an area died out inwardly of an outer margin of the blank and in part an area which can be nested relative to a recessed area of an adjacent blank cut from a sheet or web of the paperboard stock.*

Another object is to provide a carrier of this sort, featuring a protective ply disposed between other plies of a longitudinal partition and handle member and a two-ply top reinforcing element for said member, in which said element is excised [in the main] from [an otherwise waste area of] a blank in such a manner as to provide a finished surface at the top of the member, suitable for printing and/or decoration.

*Yet another object is to provide an improved paperboard article carrier in which an outer reinforcing and finished panel is foldably associated with a longitudinal partition unit and is externally overlapped in relation to the latter to serve as a handle member of the carrier. This reinforcing and finish panel is so located in a blank from which the carrier is fabricated as to be capable of anchoring itself relative to other areas of the blank as same proceeds through a gluing and folding machine on which the carrier is made.*

*A still further object of the invention is to provide a carrier in which the outer reinforcing and finish panel is located at an external margin of a paperboard blank from which the carrier is constructed.*

*Another specific object is to provide an improved article carrier having cross partition panels of novel construction, being adapted to be swung outwardly relative to a longitudinal partition panel and secured to a side wall panel, these cross partition elements featuring an improved way of deriving a glue lap for so securing the same, in which the glue lap on one cross partition element is taken from the material of an adjacent succeeding cross partition element.*

*Yet another specific object is to provide an article carrier featuring an improved cross partition structure as described in the preceding paragraph, in combination with a protective panel or flap hinged at the bottom margin of a longitudinal partition unit to which the cross partition elements are hinged, whereby openings exposed by the outward swinging of the cross partition elements are covered by this panel or flap in an upwardly folded position thereof.*

*A general object of the invention is to provide an improved carrier having an outer protective and finish panel on its grip portion, an upturned, longitudinal partition protecting panel and the improved cross partition arrangement mentioned above, in which all of these provisions are positioned in the blank so as to permit maximum economy of material required to make the carrier.*

A still further object is to provide an improved blank suitable for the manufacture of such an article carrier.

The foregoing statements are indicative in a general way of the nature of the invention. Other and more specific objects will be apparent to those skilled in the art upon a full understanding of the construction and operation of the device.

A single embodiment of the invention is presented herein for purpose of illustration. It will be appreciated that the invention may be incorporated in other modified forms coming equally within the scope of the appended claims.

Figure 8:
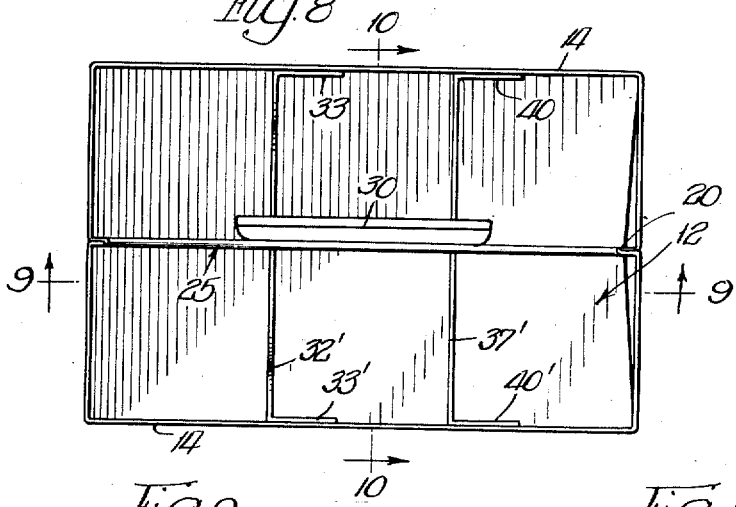
Fig. 8 is a top plan view of the erected carrier.
Figure 9:
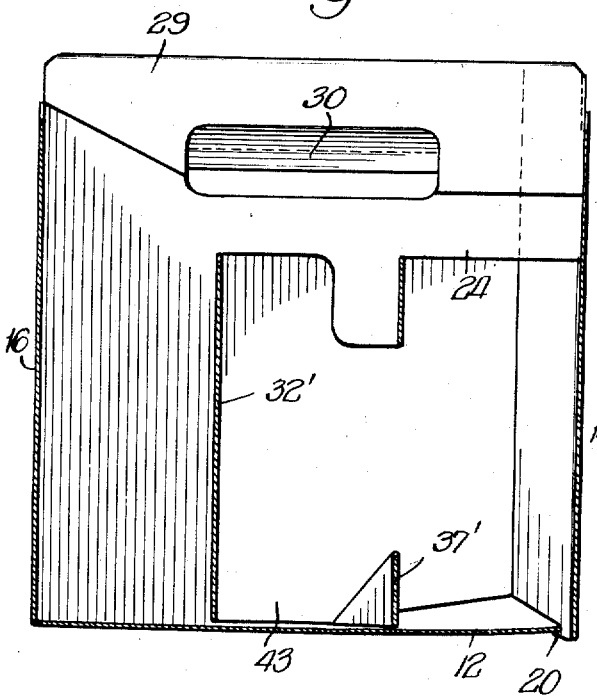
Figure 10:
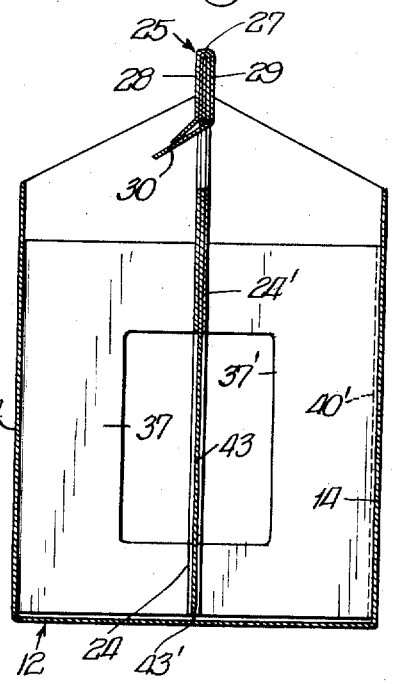

Figs. 9 and 10 are, respectively, views in longitudinal and transverse vertical section along lines 9—9 and 10—10 of Fig. 8.

Figure 1:
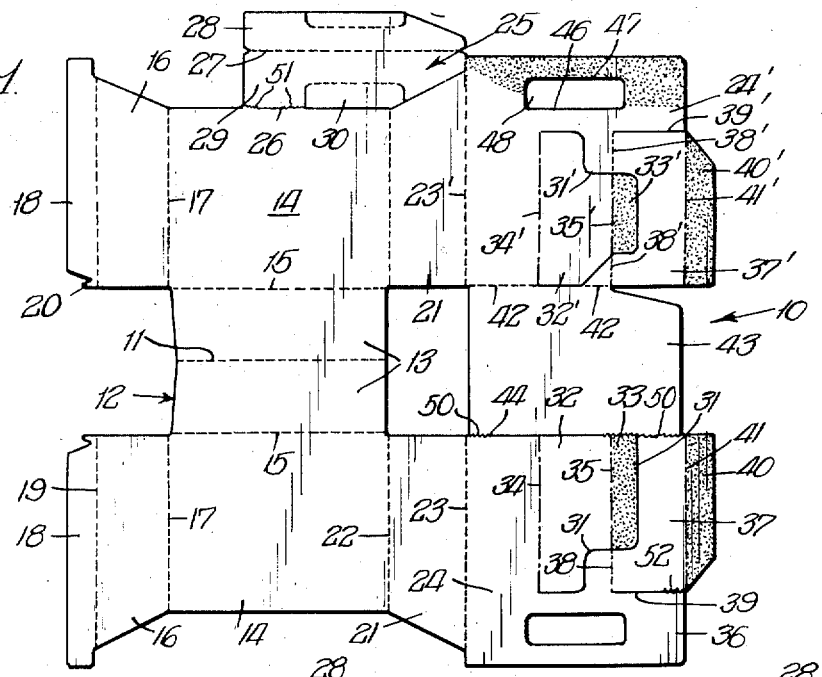
Fig. 1 is a top plan view of the slitted and creased flexible paperboard blank from which the improved bottle carrier is formed, showing preliminary gluing thereof.

Referring to Fig. 1 of the drawings, the improved bottle carrier is manufactured from a flexible paperboard blank 10. This blank is to a considerable extent symmetric about a medial horizontal crease line 11 of a bottom forming section 12, which defines two like bottom panels 13 in that section. Hence corresponding parts and relationships on opposite sides of crease line 11 are indicated by like reference numerals, and only one set thereof is described.

A rectangular side wall panel 14 is hinged to bottom section 12 by a horizontal marginal crease 15, and this panel carries an end wall panel 16, hinged thereto by a vertical crease 17. Panel 16 is provided with a glue lap 18, which is hinged thereto by crease 19. A notched bottom locking lug 20 is formed on the inner or bottom extremity of glue lap 18.

A further end wall panel 21 is conjoined by crease 22 to the opposite end of side wall panel 14. It is similar in size and shape to the other end wall panel 16. A crease 23 serves to hinge to one of the panels 21 a longitudinal partition and handle panel 24 and a corresponding crease 23' in the other section of blank 10 acts to hinge to its end wall panel a second longitudinal partition and handle member, designated 24'.

An outer or top extension of the crease 23' serves the purpose of hinging to partition and handle member 24' an outer handle reinforcing and finishing member 25. This is separated from side and end wall panels 14, 21 by a slit 26 which outlines the top margins thereof. Member 25 is subdivided by a horizontal crease 27 into a pair of outer reinforcing sections 28, 29, both of which are slitted and creased to define handhole tabs 30 of known sort. The purpose of member 25 will be hereinafter described.

The longitudinal partition and handle panels 24, 24' are slitted and creased to set out similar cross partition structures. Like reference numerals, primed, are employed to designate parts or elements in panel 24' corresponding to those of panel 24.

Panel 24 is provided with a shaped slit 31 which outlines the free marginal edge of a cross partition element 22 and a glue lap 33 on that element. The element is hinged to panel 24 by a crease 34 paralleling the crease 23; the glue lap 33 is foldably connected to element 32 by a parallel crease 35. Slit 31 extends from a point beneath a grip portion 36 of panel 24 inwardly the full dimension of the panel, terminating at a point which coincides with the bottom of the latter.

A further cross partition panel element 37 is hinged to panel 24 by means of a short transverse crease 38 which is, in actuality, an extension of crease 35. Element 37 is freed from panel 24 by a horizontal slit 39 extending from the outer terminus of crease 38 to the right hand side edge of panel 24. Cross partition panel element 37 is also separated by the shaped slit 31 from the glue lap 33 of the other cross partition element 32. Panel element 37 carries its own glue lap 40, which is hinged thereto by a vertical crease 41.

*It is to be noted that the glue laps 33, 33' of elements 32, 32', respectively, are excised by the shaped slits from the material of the adjacent succeeding cross partition panel elements 37, 37'. This leaves only a relatively small opening in each of those elements, at a side thereof, hence contact of bottles separated by the partition elements is not possible at their point of maximum dimension across a cell defined by the elements. It is also evident that glue laps of still further cross partition elements, for example in a 12-article carrier, can be formed in the same way. The structural relationship is a very practical one in the construction of the carrier on existing folding and gluing machinery.*

The longitudinal partition and handle panel 24' differs from the panel 24 in that its shaped slit 31', which defines the free edge of cross partition element 32' and its hinged glue lap 33' is angled reversely at its inner extremity to intersect with a horizontal bottom crease 42 at the inner horizontal margin of panel 24'. It is reversely directed along the line of said crease to the inner terminal of the partition hinging crease 34'.

A reinforcing and bottle separating flap section 43 is separated from the longitudinal partition and handle panel 24 by a horizontal slit 44 which coincides with the inner or bottom margin of the last named panel. Section 43 is hinged to the inner or bottom margin of the panel 24' by the horizontal crease 42 and is foldable upwardly about said crease in assembling the carrier, being disposed between the longitudinal partition and handle panels 24, 24' in the completed condition of the carrier, for a purpose to be described. [The panels 24, 24' are provided with U-shaped slits 46 and horizontal creases 47 connecting the ends thereof, thus to define handhole openings normally closed by hinged flaps 48, in a well known manner.]

*The grip portions of panel 24, 24' are provided with handhole openings 48 in the form of elongated rectangular apertures, the opening in panel 24' being defined at its inner and outer sides by horizontal edges 46, 47, for a purpose to be described.*

In assembling the carrier from the blank 10 illustrated in Fig. 1, adhesive is applied to the glue laps 33, 33', 40, 40' and to the outer portion of panel member 24', as indicated by stippling. Panel members 24, 24' and their associated parts are then folded upwardly, inwardly and downwardly about creases 23, 23' respectively, causing the glue laps to adhere to the respective side walls 14 and the glued portion of panel 24' to adhere to the portion 29 of the outer reinforcing handle member 25. This leaves the blank in the condition shown in Fig. 2.

Figure 2:
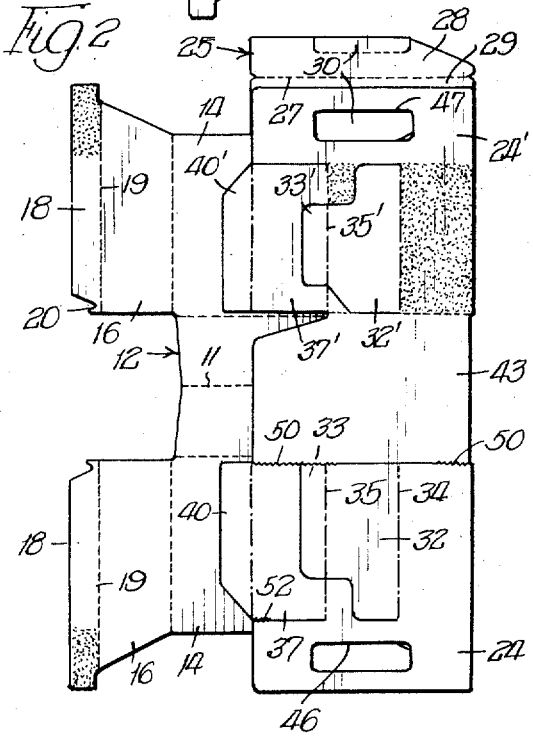
Fig. 2 is a top plan view of the blank following a first folding operation also indicating the application of adhesive preceding a second fold.
Figure 3:
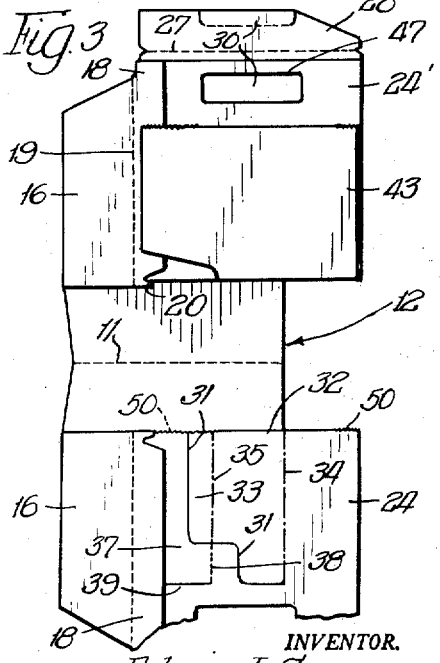
Fig. 3 is a top plan view showing the blank following the second fold and indicating a further application of adhesive.

Further adhesive is applied to terminal glue laps 18 and to the exposed surface of panel 24' as indicated by stippling in Fig. 2. End wall panels 16 are now folded upwardly, inwardly and downwardly about creases 19, adhering the glue laps 18 to the upper portions of panels 24, 24'. The section 43 is next folded upwardly, inwardly and downwardly about its hinge 42 into face-to-face relation to the panel member 24', to which it is thus adhered, leaving the blank in the condition illustrated in Fig. 3.

Figure 4:
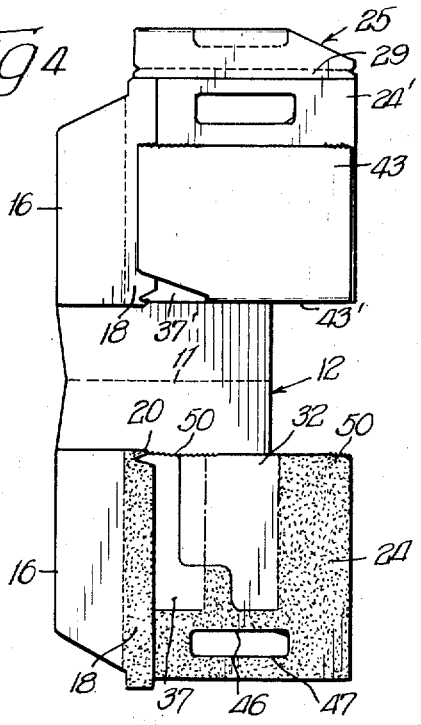
Figs. 4 and 5 are top plan views of the blank after still further manipulations.
Figure 5:
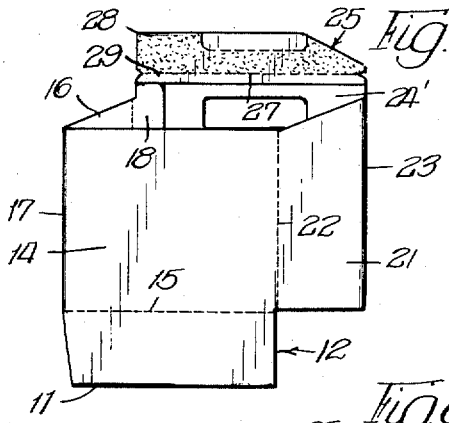

Adhesive may now be applied, as indicated by stippling in Fig. 4, to the longitudinal partition and handle panel 24, and a glue lap 18, after which the two sections of the blank are folded about medial bottom crease 11 into adhered relation to one another as shown in Fig. 5.

Figure 6:
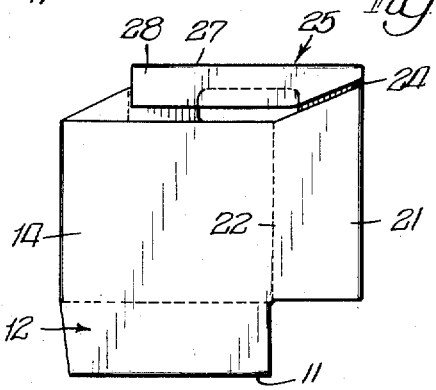
Fig. 6 is a top plan view of the carrier in its finished, knocked down condition.

The carrier is completed by applying adhesive to the exposed portion or section 28 of the outer handle reinforcing and finishing member 25, as stippled in Fig. 5. This section is then folded about the subdividing crease 27 and adhered to the exposed surface of the opposed panel 24, leaving the carrier in the completed, knock-down condition of Fig. 6.

Figure 7:
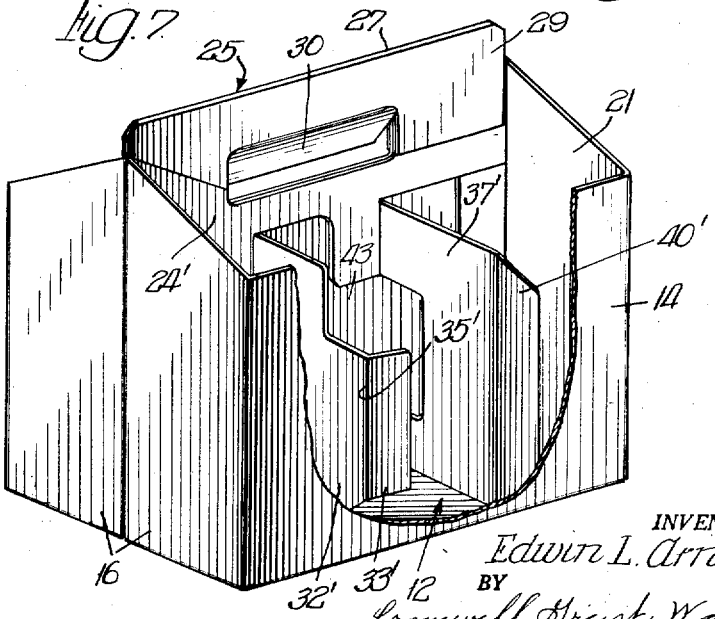
Fig. 7 is a perspective view in enlarged scale, partially broken away, showing the completed and erected carrier.

As shown in Figs. 7 and 9 the swinging of the cross partition panel elements 32, 32', 37, 37' about their respective integral hinges, in erecting the carrier, results in the presence of openings of substantial size in the longitudinal partition panels 24, 24', due to the relatively large area and substantial height of the bottle separating cross partition panels 32, 32', 37, 37' cut therefrom. The relatively large reinforcing and protecting section 43 covers these openings and affords full depth bottle protection, without consuming extra paperboard stock. It is evident that the section 43 adds its strength and rigidity to the associated panels 24, 24' of the longitudinal partition and handle unit which these panels make up, affording improved rigidity for this part.

When the carrier has been erected to the set up condition of Fig. 7, one end of the bottom 12 is engaged over the latching lugs 20 on the inturned and adhered glue laps 18, thus to hold the carrier in erected condition ready for loading manually or by automatic loading equipment.

Blank 10, as shown in Fig. 1, is disposed with its smooth and finished, printed or decorated side underneath and its rough, unfinished surface exposed. Hence it is seen that when the carrier is in the completed condition illustrated in Figs. 6–10 inclusive the longitudinal partition and suspending or handle unit of the carrier, made up of panels 24, 24' and section 43, is externally encased along its top by the two-ply outer reinforcing member 25. The exposed opposite surfaces of this member are finished in character and may bear ornamentation or printing. In addition, the rigidifying effect of the doubled-over member 25 is, of course, substantial. The carrier presents an entirely integral side wall and bottom construction, free from glued joints likely to come apart when wet. Notwithstanding this the upper edge of the carrier handle is finished off in very attractive manner.

Reference has been made to the separation of flap section 43 from panel 24 by slit 44. In actuality the flap is temporarily held to the panel, as the blank traverses the first stages of the folding thereof, by nicks 50. The same function is performed by the nicked connections 51 and 52, respectively, between the handle reinforcing member 25 and side wall panel 14 and between the end cross partition elements 37, 37' and the remainder of the respective panels 24, 24'. The nicks readily rupture as the associated parts are manipulated by a gluing and folding machine.

*The nicked connection 51 of handle reinforcing member 25 to side wall panel 14 affords control of the member in manufacture, by preventing separation from the panel 14 to which it is thus severably connected as the blank passes through a gluing and folding machine. Inspection of Figs. 1 and 2 indicates that the same function of controlling member 25 may also be served, if desired, by performing a further simple folding operation at an intermediate stage in the manufacturing cycle.*

*The action just referred to is made possible due to the position of the handhole tab designated 30 in Fig. 1, the hinging of this tab to handle portion 29 along a line paralleling and spaced outwardly from slit 26, and the positional relationship of this hinge to the outermost horizontal margins 46, 47 of a rectangular handhole 48 in panel 24'. That is, the handhole tab may be manipulated, once the blank is in the position shown in Fig. 2, by bending the same 180° upwardly through opening 48 and then outwardly, adhering the same to the adjoining upper exposed surface of member 24' by previously applied adhesive. Such manipulation will result in a positive interlock of handle member 25 to a member 24' as the blank proceeds through the gluing machine.*

I claim:

1. A one-piece article carrier blank of flexible paperboard stock, comprising two sets of side wall, end wall and longitudinal partition and handle-forming panels, the respective panels of each of said sets being integrally connected by vertical creases in the order named, a one-piece bottom-forming panel disposed between and integrally connected by horizontal creases to adjacent bottom-defining margins of said side wall panels, cross partition sections integrally hinged by vertical creases to said partition and handle-forming panels and swingable about those hinge creases out of the planes of the respective last named panels, a protective section of substantial area integrally hinged by a horizontal crease to a bottom-defining margin of one of said partition and handle-forming panels, said protective section lying between said partition and handle-forming panels and being readily displaceable by swinging about its said hinge crease out of the plane of one thereof, and a handle reinforcing unit associated with one of said sets of panels, said unit being integrally hinged by a vertical crease to an end of the partition and handle-forming panel of its associated set and being separated at least in part by a cut from a top-defining margin of the end and side wall panels of said last named set, the outer margin of said reinforcing unit lying substantially outwardly, in the lateral sense, of the outer margin of its associated partition and handle-forming panel and opposed outer margins of said side wall panels lying substantially inwardly of the outer margins of said respective partition and handle-forming panels, *a substantial part of* said reinforcing unit occupying a space between said separating cut therefor and a longitudinal projection of said outer margin of its associated partition and handle-forming panel, and being provided with a horizontal crease in substantial alignment with said outer margin of its associated partition and handle-forming panel.

2. An article carrier blank in accordance with claim 1, in which said protective section hinge crease is disposed outwardly, in the longitudinal sense, of the vertical crease hinging to one another the partition and handle-forming panel and the end wall panel of a panel set.

*3. A blank in accordance with claim 1 in which said partition and handle forming panels each have a handhole therein and said reinforcing unit has a tab pivoted thereon in a position to swing through at least one of said handholes when the article carrier is completed.*

*4. A blank in accordance with claim 1 in which said partition and handle forming panels each have a handhole therein and said reinforcing unit has a tab pivoted thereon inwardly of the outer margin thereof and in a position to swing through at least one of said handholes when the article carrier is completed.*

*5. A one-piece article carrier blank of flexible paperboard stock, comprising two sets of side wall, end wall and longitudinal partition and handle-forming panels, the respective panels of each of said sets being integrally connected by vertical creases in the order named, a one-piece bottom-forming panel disposed between and integrally connected by horizontal creases to adjacent bottom-defining margins of said side wall panels, a longitudinal partition section of substantial area integrally hinged by a horizontal crease to a bottom-defining margin of one of said partition and handle-forming panels, said longitudinal partition section lying between said partition and handle-forming panels and being readily displaceable by swinging about its said hinge crease out of the plane of one thereof, and a handle reinforcing unit associated with one of said sets of panels, said unit being integrally hinged by a vertical crease to an end of the partition and handle-forming panel of its associated set and being separated at least in part by a cut from a top-defining margin of the end and side wall panels of said last named set, the outer margin of said reinforcing unit lying substantially outwardly, in the lateral sense, of the outer margin of its associated partition and handle-forming panel, which panel outer margin generally coincides with the top of a carrier partition and handle of which said last named panel is a part, and opposed outer margins of said side wall panels lying substantially inwardly of the last named outer margins of said respective partition and handle-forming panels, a substantial part of said reinforcing unit occupying a space between said separating cut therefor and a longitudinal projection of said outer margin of its associated partition and handle-forming panel, and being provided with a horizontal crease in substantial alignment with said outer margin of its associated partition and handle-forming panel.*

*6. An article carrier blank in accordance with claim 5, in which said protective section hinge crease is disposed outwardly, in the longitudinal sense, of the vertical crease hinging to one another the partition and handle-forming panel and the end wall panel of a panel set.*

References Cited in the file of this patent or the original patent

UNITED STATES PATENTS

| Number | Name | Date |
|---|---|---|
| 681,685 | Domingnez | Sept. 3, 1901 |
| 1,157,712 | Miller | Oct. 26, 1915 |
| 1,765,104 | Shearer | June 17, 1930 |
| 2,097,941 | Wells | Nov. 2, 1937 |
| 2,302,676 | Crane | Nov. 24, 1942 |
| 2,354,528 | Lowey | July 25, 1944 |
| 2,525,686 | Kowal | Oct. 10, 1950 |
| 2,535,741 | Lighter | Dec. 26, 1950 |
| 2,537,452 | Forrer | Jan. 9, 1951 |
| 2,537,615 | Arneson | Jan. 9, 1951 |
| 2,545,803 | Bergstein | Mar. 20, 1951 |
| 2,584,689 | Foster | Feb. 5, 1952 |
| 2,586,301 | Castle | Feb. 19, 1952 |
| 2,615,612 | Vines | Oct. 28, 1952 |